(12) United States Patent
Brustoloni

(10) Patent No.: US 7,155,740 B2
(45) Date of Patent: Dec. 26, 2006

(54) METHOD AND APPARATUS FOR ROBUST NAT INTEROPERATION WITH IPSEC'S IKE AND ESP TUNNEL MODE

(75) Inventor: Jose' C. Brustoloni, Westfield, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 691 days.

(21) Appl. No.: 09/902,520

(22) Filed: Jul. 10, 2001

(65) Prior Publication Data

US 2002/0046348 A1    Apr. 18, 2002

Related U.S. Application Data

(60) Provisional application No. 60/217,911, filed on Jul. 13, 2000.

(51) Int. Cl.
  *G06F 15/16* (2006.01)
  *H04L 12/28* (2006.01)

(52) U.S. Cl. ........................... 726/15; 370/392
(58) Field of Classification Search ................ 713/201; 370/392; 726/15
  See application file for complete search history.

(56) References Cited

U.S. PATENT DOCUMENTS

| | | | |
|---|---|---|---|
| 5,805,803 A * | 9/1998 | Birrell et al. ............... | 713/201 |
| 6,615,357 B1 * | 9/2003 | Boden et al. .................. | 726/15 |
| 6,678,258 B1 * | 1/2004 | Capurka et al. ............. | 370/328 |
| 6,765,931 B1 * | 7/2004 | Rabenko et al. ............ | 370/493 |
| 6,795,917 B1 * | 9/2004 | Ylonen ....................... | 713/160 |
| 6,832,322 B1 * | 12/2004 | Boden et al. ................. | 726/15 |
| 6,886,103 B1 * | 4/2005 | Brustoloni et al. ........... | 726/15 |
| 6,963,982 B1 * | 11/2005 | Brustoloni et al. ........... | 726/15 |
| 2001/0034831 A1 * | 10/2001 | Brustoloni et al. ......... | 713/151 |
| 2002/0029276 A1 * | 3/2002 | Bendinelli et al. .......... | 709/227 |
| 2002/0083344 A1 * | 6/2002 | Vairavan ..................... | 713/201 |
| 2003/0179742 A1 * | 9/2003 | Ogier et al. ................ | 370/351 |

OTHER PUBLICATIONS

Website: http://www.ietf.org/rfc/rfc2401.txt?number=2401 "Security Architecture for the Internet Protocol", Nov. 1998.*
Website: http://www.ietf.org/rfc/rfc2409.txt?number=2409 "The Internet Key Exchange (IKE)", Nov. 1998.*
Website: http://www.ietf.org/rfc/rfc2406.txt?number=2406 "IP Encapsulating Security Payload (ESP)", Nov. 1998.*

(Continued)

*Primary Examiner*—Ayaz Sheikh
*Assistant Examiner*—Kaveh Abrishamkar
(74) *Attorney, Agent, or Firm*—Stephen M. Gurey

(57) ABSTRACT

Linux's NAT (Network Address Translator) implementation, IP Masquerade, includes a VPN Masquerade feature that provides interoperation of NAT with IKE and ESP tunnel mode within the IPSec security protocol suite. VPN Masquerade uses heuristics to route packets from a server on the Internet to a client on a local network that shares access to the Internet with other clients over a common access link through a router running NAT. VPN Masquerade, however, is susceptible to crashes, collisions and race conditions that can disable IPSec communication. These are prevented, or recovery from such is automatically effected, by sending over a tunnel a control packet, a "ping", from the client at one end of the tunnel to the server at the other end of the tunnel, and then waiting to send any packets other than a control packet over the tunnel until a responsive control packet is received from the server.

28 Claims, 7 Drawing Sheets

OTHER PUBLICATIONS

Website: http://wp.netscape.com/eng/ssl3/draft302.txt "The SSL Protocol Version 3.0", Nov. 18, 1998.*
Website: http://www.impsec.org/linux/masquerade/ip_masq_vpn.html "Linux VPN Masquerade", submitted as prior art by applicant.*
Eun-Sang Lee, Hyun-Seok Chae, Byoung-Soo Park, Myung-Ryul Choi, "An Expanded NAT with Server Connection Ability", Sep. 15-17, 1999, TENCON 99. Proceedings of the IEEE Region 10 Conference, vol. 2, pp. 1391-1394.*
Website: http://www.rfc-editor.org/rfc/rfc2409.t, "The Internet Key Exchange (IKE)" pp. 1-36, Oct. 26, 2000.
Website: http://www.rfc-editor.org/rfc/rfc2401.t, "Security Architecture for the Internet Protocol" pp. 1-57, Oct. 26, 2000.
Website: http://www.impsec.org/linux/masquerade/ip_masq_vpn.html, "Linux VPN Masquerade" pp. 1-6, May 23, 2001.
Website: http://www.rfc-editor.org/rfc/rfc2402.t, "IP Authentication Header" pp. 1-19, Oct. 26, 2000.
Website: http://www.rfc-editor.org/rfc/rfc2460.t, "Internet Protocol, Version 6 (Ipv6) Specification" pp. 1-34, Oct. 26, 2000.
Website: http://www.rfc-editor.org/rfc/rfc2406.t, "IP Encapsulating Security Payload (ESP)" pp. 1-19, Oct. 26, 2000.
Website: http://www.rfc-editor.org/rfc/rfc2408.t, "nternet Security Association and Key Management Protocol (ISAKMP)" pp. 1-75, Oct. 26, 2000.
U.S. Appl. No. 09/698,973, filed Oct. 27, 2000, Brustolini.
U.S. Appl. No. 09/698,978, filed Oct. 27, 2000, Brustoloni.

* cited by examiner

FIG. 4

| 401 | 402 | 403 | 404 | 405 |
|---|---|---|---|---|
| CLIENT IP ADDRESS | SERVER IP ADDRESS | INITIATOR COOKIE | RESPONDER COOKIE | EXPIRATION TIME |

FIG. 5

| 501 | 502 | 503 | 504 | 505 |
|---|---|---|---|---|
| CLIENT IP ADDRESS | SERVER IP ADDRESS | INCOMING SPI | OUTGOING SPI | EXPIRATION TIME |

METHOD AND APPARATUS FOR ROBUST NAT INTEROPERATION WITH IPSEC'S IKE AND ESP TUNNEL MODE

CROSS-REFERENCE

This application claims the benefit of U.S. Provisional Application No. 60/217,911, filed Jul. 13, 2000.

TECHNICAL FIELD

This invention relates to packet-based data communications on IP networks using a security protocol, and more particularly, to the interoperability of such communications with a network address translator (NAT), which enables communications between clients on a private network and servers on a global network such as the Internet.

BACKGROUND OF THE INVENTION

A plurality of clients can share a single access link to the Internet or other IP network by using network address and port translation. In accordance with NAT, the clients on a private network are assigned individual IP addresses from a pool of IP addresses reserved by the Internet Assigned Numbers Authority (IANA) for non-exclusive private network use. Private addresses are not routable on the Internet. When a client on the private network wants to communicate with a server on a global network, such as the Internet, a globally unique and routable IP address must be used instead of the client's local non-routable private IP address. Typically, a private network is connected to the Internet via a router and shared access link to an Internet Service Provider (ISP). NAT is a feature that may be implemented in the router and that provides unambiguous translations between private and global addresses, allowing the plural clients to share the access link. When a client sends a packet to a foreign address (i.e., one not in the private network), NAT modifies the packet header, substituting the client's private source IP address and generalized port number (GPN) by a global IP address and GPN. Depending upon the protocol being used, GPN is a certain field in the packet header. For example, for the TCP or UDP protocols, the GPN is the TCP or UDP port number. For other protocols, the GPN may be another field. A single global IP address may be shared as the source address of packets sent by all or some of the clients to the Internet. In order to properly route incoming packets sent from a foreign address on the Internet to a client on the private network, NAT maintains, in a translation table in memory, the one-to-one correspondence between private and global IP addresses and GPNs. When NAT receives a packet from the Internet, NAT modifies the packet header's destination from global to private (IP address, GPN) values, according the NAT's translation table, allowing the packet to reach the respective client in the private network. Some application-layer protocols may also include IP addresses and possibly port numbers in packet payloads. Such addresses and port numbers must also be similarly translated. For each such protocol, NAT includes an Application Level Gateway (ALG) program that provides these additional necessary translations. Furthermore, when the NAT performs its translations, the packet checksum in the transport layer TCP or UDP header of the packet is correspondingly modified to reflect the changes resulting from the translations. Thus, when the packet is eventually received at its destination, its checksum will be correct if there are no transmission errors.

The use of network address translation presents difficulties when it does not or cannot support a particular protocol that a client is desirous of using. As an example, certain security architectures have not been able to be fully interoperable with NAT. Security protocols are extremely useful in determining whether or not a received packet has been corrupted in some manner between the client/servers from which it is transmitted and received. In order to prevent packet forgery and snooping, authentication and encryption of packets may be used, respectively. Various security protocols may be used for authentication and/or encryption. Some protocols can be used in conjunction with NAT, for example the Secure Shell (SSH), Secure Sockets Layers (SSL), and Point-to-Point Tunneling Protocol (PPTP). Disadvantageously, however, SSH and SSL implement security in the application layer and are thus application-dependent, whereas PPTP's security is often considered deficient. On the other hand, the IP Security (IPSec) protocol operates at the network layer and therefore is independent of the transport- (e.g., TCP or UDP) or application-layer protocol (e.g., HTTP, FTP, or TELNET). It is thus application independent and therefore capable of providing end-to-end security without modification to applications. Further, IPSec is vendor-independent and can provide end-to-end security. Disadvantageously, however, IPSec has been considered as not being interoperable with NAT. In fact, the literature has so stated (see, e.g., M. Doraswamy and D. Harkins, "IPSEC: The New Security Standard for the Internet, Intranets and Virtual Private Networks," Prentice-Hall, $1^{st}$ ed., July 1999).

IPSec is an Internet standard from the IETF IPSec Working Group (see, e.g., S. Kent and R. Atkinson, "Security Architecture for the Internet Protocol," IETF, RFC 2401, November 1998). IPSec is a mandatory part of the next-generation IP protocol (IPv6, see, e.g., S. Deering and R. Hinden, "Internet Protocol, Version 6 (Ipv6) Specification," IETF, RFC 2460, December 1998), but most existing IPSec implementations assume current-generation IP (IPv4). IPSec is essentially an encapsulation protocol, namely one that defines the syntax and semantics of placing one packet inside another. IPSec defines two protocols, the Authentication Header (AH) protocol (see, e.g., S. Kent and R. Atkinson, "IP Authentication Header," IEFT, RFC 2402, November 1998) and Encapsulating Security Payload (ESP) protocol (see, e.g., S. Kent and R. Atkinson, "IP Encapsulating Security Payload (ESP)," IEFT, RFC 2406, November 1998). The AH protocol can provide authentication of packet origin, proof of integrity of packet data, and protection against packet replay. In addition to that which the AH protocol can provide, the ESP protocol can provide encryption of packet data and limited traffic flow confidentiality. The AH and ESP protocols can be used either in what are known as the transport or tunnel modes. The transport mode provides end-to-end security between the source of the packet and its destination. In contrast, the tunnel mode encapsulates packets and thus provides security between the nodes where the packet is encapsulated and decapsulated, which can be any nodes (e.g., routers) on the path between the source of the packet and its destination. Depending on the situation, clients might use different modes. Thus, for example, the transport mode may be used to download, via FTP, a document from a supplier's server, thus providing full authentication/security between the client and the server. On the other hand, a client can use the tunnel mode to connect to an IPSec gateway onto an employer's Intranet.

Several problems hamper the interoperation of IPSec and NAT. For the AH protocol, when NAT translates an address, it would need to correspondingly adjust, through an ALG program, the packet's authentication data, which depends on the packet's address. If the authentication data is not adjusted the packet will be rejected at the destination. In order for the NAT to modify the authentication data, however, the NAT would need to know the authentication key. Since that key is maintained private in order to protect the integrity of the security architecture, NAT is unable to modify the authentication data in the packet to compensate for the address translations. Thus, NAT, as it is conventionally used, is not interoperable with the AH protocol. For the ESP protocol, interoperability with NAT is problematic in the transport mode. In the transport mode of the ESP protocol, when NAT translates the source or destination IP address, it would need to correspondingly adjust the TCP or UDP checksum, which is calculated over the packet's IP "pseudo-header," TCP or UDP header, and packet data. The pseudo-header includes the source and destination IP addresses. However, since the checksum is encrypted, along with the rest of the TCP or UDP header and data, NAT cannot make the necessary adjustment to this checksum without having access to the encryption key. For end-to-end security, the encryption key must not be revealed to intermediate nodes including NAT. Thus, NAT is also not interoperable with the ESP protocol in the transport mode. In co-pending patent applications entitled "Method and Apparatus for Application-Independent End-to-End Security in Shared-Link Access Networks, Ser. No. 09/698,978, and "Method and Apparatus for Extending Network Address Translations for Unsupported Protocol", Ser. No. 09/698,973, both filed Oct. 27, 2000, both incorporated herein by reference, a technique is described for extending NAT to be capable of providing network address translation of outgoing and incoming packets from and directed to clients, respectively, operating under a protocol that NAT itself does support such as, for example, IPSec. As described in these co-pending applications, NAT is extended by creating entries in a translation table when it receives a request from a client using a protocol that it does not support, such as IPSec's AH protocol or the ESP protocol in the transport mode. Further, ALGs that would otherwise be needed at the NAT are included at the client, which also pre-compensates outgoing packets before they are transmitted and post-compensates incoming packets for the effects on the packets of the NAT's translation. These techniques advantageously enable NAT interoperability with unsupported protocols, such as IPSec, but require modification of the NAT itself.

With respect to other IPSec protocols such as IKE (see, e.g., D. Maughan, M. Schertler, M. Schneider and J. Turner, "Internet Security Association and Key Management Protocol [ISAKMP]," IETF, RFC 2408, November 1998; and D. Harkins and D. Carrel, "The Internet Key Exchange (IKE)," IETF, RFC 2409, November 1998) and the ESP tunnel protocol, Linux's NAT implementation, called IP Masquerade, includes a feature called VPN Masquerade, which provides NAT interoperation with the IKE and ESP tunnel protocols. IKE is used for negotiation of cryptographic protocols, algorithms, and keys and the ESP tunnel mode is described above. NAT support for these protocols is possible because they do not authenticate or encrypt any information that depends on the IP header of the packet itself (IKE) or encapsulating packet (ESP tunnel mode), unlike the AH and ESP transport modes.

VPN Masquerade running on NAT translates only the source or destination IP address of IKE packets and ESP tunnel mode encapsulating packets. In this regard, VPN Masquerade differs markedly from IP Masquerade's handling of TCP and UDP packets. In the latter cases, IP Masquerade also translates the source or destination port number, so that all clients can use the same global IP address, and NAT can identify the particular client using the port number. Similar translations in IKE and ESP tunnel mode are not possible because port numbers and other identifiers are cryptographically protected.

In the following, "client" denotes a computer connected to a private network that is in turn connected to the Internet through a NAT, and "server" denotes a computer connected to the Internet and not connected to the aforementioned private network.

Because all clients share a single global IP address, VPN Masquerade allows, by default, at most one IKE and one ESP session between clients and any given server. When a packet returns from the server, VPN Masquerade uses the server's IP address to identify the corresponding client. If a client sends an IKE or ESP packet to a server that has an ongoing IKE or ESP session with another client, respectively, VPN Masquerade drops that packet.

The limitation of at most one client per server may be acceptable for certain situations, such as in a home office. It is not, however, acceptable for other situations, such as in a conference center, where multiple attendees may work for the same company and simultaneously want to access the respective VPN server back in their home office. In the latter cases, VPN Masquerade may be configured to operate without this limitation, using the techniques and heuristics described below.

When more than one client may access the same server, VPN Masquerade identifies the particular client by checking the server's IP address and, for IKE, the initiator and responder cookies, or, for ESP, the incoming SPI (Security Parameters Index). Cookies and SPIs are transmitted unencrypted in IKE and ESP headers, respectively. Each cookie has 64 bits and is selected randomly at the beginning of an IKE session to uniquely identify the session within the respective IPSec peer (see, Maughan et al., "Internet Security Association and Key Management Protocol," cited above). SPIs have 32 bits and are randomly selected during an IKE negotiation to uniquely identify a security association (SA) in the respective destination IPSec peer (see, Kent et al. "Security Architecture for the Internet Protocol," cited above). Each epoch of an ESP tunnel is defined as the combination of two SAs, one in each direction. SAs always have a limited lifetime, after which an IKE negotiation takes place to establish a new epoch's SAs with new keys and SPIs. SPIs are transmitted encrypted in IKE negotiations. The negotiations to establish each new epoch's SAs with new keys and SPIs begin at a certain time before the end of an epoch, and may be started by either the client or server. Once negotiations are completed, a switchover to the new epoch immediately takes place. Such overlap between epochs is necessary to enable renegotiation of keys and SPIs for the new epoch before the previous epoch has ended.

VPN Masquerade handles IKE as follows. VPN Masquerade maintains a hash table of items containing client and server IP addresses and initiator and responder cookies. Each item corresponds to an IKE session. An item is considered outstanding or established according to whether the responder cookie is null or not, respectively. When a client sends a packet such that no item in the table matches the client and server IP addresses and initiator cookie, VPN Masquerade creates an outstanding item containing those values. Conversely, when a server sends a packet such that no established item in the table matches the server IP address and initiator and responder cookies, but an outstanding item matches the server IP address and initiator cookie, VPN Masquerade converts that item into an established one, including the packet's responder cookie. VPN Masquerade then forwards the packet to the corresponding client.

VPN Masquerade allows more than one client to use the same initiator cookie with the same server. This is possible because each client chooses initiator cookies independently. It is thus possible, but highly unlikely, that two clients would choose the same initiator cookie. Specifically, if n clients simultaneously have an IKE session with the same server and use "good" random number generators, the probability of such a collision of initiator cookies is about $(n-1)/(2^{64})$. VPN Masquerade correctly handles the unlikely situation when more than one client has the same initiator cookie by using the responder cookie to correctly identify the client. To do this, VPN Masquerade needs to slightly modify the above rules and serialize the initial IKE handshake as follows. When a client C1 sends a packet whose client and server IP addresses and initiator cookie match no item in the table, but whose server IP address and initiator cookie match another client C2's outstanding item, VPN Masquerade drops that packet. Eventually, when C1's IKE implementation retries the transmission, after timeouts, C2's item will already be established, and VPN Masquerade will forward C1's packet normally.

VPN Masquerade handles ESP as follows. VPN Masquerade maintains a hash table of items containing client and server IP addresses and outgoing and incoming SPIs. Each item corresponds to an ESP tunnel's epoch, between successive rekeyings. An item is considered outstanding or established according to whether the incoming SPI is null or not, respectively. When a client sends a packet such that no item in the table matches the client and server IP addresses and outgoing SPI: (1) if the server IP address matches no outstanding item, VPN Masquerade creates an outstanding item containing the client and server IP addresses and outgoing SPI; (2) otherwise, VPN Masquerade drops the packet. Conversely, when a server sends a packet such that no established item matches the server IP address and incoming SPI: (1) if an outstanding item matches the server IP address, VPN Masquerade converts that item into an established one, including the packet's incoming SPI, and forwards the packet to the corresponding client; (2) otherwise, VPN Masquerade multicasts the packet to all clients that have recently had an IKE negotiation with the server. To thwart denial of service attacks, VPN Masquerade: (1) times out outstanding items after a short period, $T_{out}$; (2) after an outstanding ESP item of client C1 causes a packet of another client C2 to be dropped, limits to a maximum value, $N_{out}$, the number of packets that C1 may send matching the outstanding item; and (3) times out established items after a period of inactivity $T_{ei}$.

VPN Masquerade, as it currently exists, does not support fail-over recovery and is susceptible to various failure conditions that can cause it to demultiplex incoming packets incorrectly. As an example of the former, a private domain may be multi-homed and connected to the Internet via instances A and B of VPN Masquerade. If a client establishes an ESP tunnel to a server via VPN Masquerade instance A and A crashes, the client's ESP packets may be routed via VPN Masquerade instance B and reach the server, but the server's ESP packets may continue to be sent to the failed A and therefore never reach the client.

As noted, VPN Masquerade's heuristics for demultiplexing ESP packets may also cause it to demultiplex incoming packets incorrectly.

VPN Masquerade's hash tables can be viewed as soft and possibly in an incorrect state. VPN Masquerade loses state, e.g., when an item times out or VPN Masquerade crashes, but automatically reacquires state when subjected to further traffic. However, before or after recovery, VPN Masquerade's state may be incorrect.

In IKE's case, VPN Masquerade's state may at times be incomplete, but it is not incorrect (i.e., it does not incorrectly associate client and server IP addresses and initiator and responder cookies). Additionally, IKE has built-in timeouts and retry mechanisms that will promote recovery of VPN Masquerade's state, if necessary.

Similar recoverability does not exist, however, in ESP's case. VPN Masquerade's state may be incomplete, incorrect (i.e., may incorrectly associate client and server IP addresses and outgoing and incoming SPIs), or both. Additionally, ESP does not have built-in mechanisms that promote timely recovery from losses or errors in VPN Masquerade's state.

The first source of errors in VPN Masquerade's ESP state is incoming SPI collisions. As previously noted, this is possible because each client chooses incoming SPIs independently. This is, however, a rare event since if n clients have an ESP tunnel to the same server and use "good" random number generators, the probability of an incoming SPI collision each time a tunnel is created or rekeyed is approximately $(n-1)/(2^{32})$. When such an event happens, VPN Masquerade will forward to the client whose item is first established all packets sent by the server using the given incoming SPI, and remaining clients will not receive their packets.

The second source of errors in VPN Masquerade's ESP state is race conditions that may cause misassociation of outgoing and incoming SPIs. VPN Masquerade implicitly assumes that, after a tunnel is created or rekeyed, or the corresponding item in the table is timed out, or VPN Masquerade recovers from a crash, that the client uses the tunnel to send a packet to the server before the server sends a packet to the client, and, shortly after receiving this packet (but not before), the server uses the tunnel to send a packet back to the client. These assumptions may be violated in a number of cases described below.

A first race condition is described with reference to FIG. 1 where client C is shown having a tunnel T to server S through VPN Masquerade 101. If there is no outstanding item that matches S and S uses tunnel T before C does (e.g., C was downloading a file when T was rekeyed), VPN Masquerade 101 then has to multicast the packet to all clients that have recently had an IKE negotiation with the server, an inefficient use of resources.

A second race condition is described with reference to FIG. 2, where a race condition can occur when two clients C1 and C2 key or rekey their tunnels T1 and T2, respectively, through a NAT running VPN Masquerade 201, to the same server S at approximately the same time. If C1 sends a packet to S on T1 and S thereafter sends a packet to C2 on T2 before sending a packet to C1, the outstanding item created at VPN Masquerade 201 using C1's outgoing SPI will be associated with C2's incoming SPI. The packet then destined to C2 will be sent instead to C1, which will drop it when it is received. C2 will have its own outstanding item, but when subsequent packets destined for C2 arrive from server S, these packets will be sent to C1 since an established item already exists between C1 and S. Thus, C2 doesn't get its packets sent by S. Also, C1 doesn't get its packets sent by S since it cannot create a new outstanding item in view of the fact that its outgoing SPI is already used in the established item. Thus, neither C1 nor C2 receive their packets sent by S and the NAT running VPN Masquerade 201 must be rebooted to correct the problem.

With reference again to FIG. 2, a third race condition occurs when Cl sends a packet on T1, creating an outstanding item. Before S replies, however, C1's outstanding item expires since an item expires if it is not established within a defined short time after it is created. Restricting the time an item is permitted to remain outstanding is necessary since no other client is allowed to have an outstanding item to S while an item is outstanding. An item that remains outstanding for a long period of time could thus otherwise tie up traffic between another client on the same private network and the server. After C1's outstanding item expires, C2 then sends a packet to S on T2, creating a new outstanding item for C2, which is now allowed since the other outstanding item for C1 has been removed. S then finally replies to C1, thereby creating an established item with C2's outgoing SPI and C1's incoming SPI. C2 will then receive C1's packets and not its own, and C1 will not receive its packets at all.

Again referring to FIG. 2, a fourth race condition occurs when both C1 and C2 have established tunnels T1 and T2, respectively, to S for a long period of time. Both established items may expire if not used for some period time even though the tunnel remains extant (same keys, same SPIs). After the entries for both C1 and C2 expire, C2 sends a packet to S, creating an outstanding item for C2. S then sends a packet to C1, again creating an established item between C2's incoming SPI and C1's outgoing SPI. As in the previous race conditions, neither C1 nor C2 receive their respective packets.

As described, VPN Masquerade failures may cause it to forward ESP packets to clients other than the intended recipients. ESP preserves security in spite of these errors, because ESP's verification of packet authenticity and/or decryption depends on keys held only by the packets's intended recipient, and other clients simply drop the misdelivered packets. However, VPN Masquerade failures may also prevent the intended recipients from receiving their ESP packets. In this regard, neither ESP nor IKE nor higher-level protocols (e.g., TCP) provide timely recovery. IKE may clear collisions and misassociations when the lifetimes of the tunnels involved expire, but lifetimes are often long, lasting at least several hours.

SUMMARY OF THE INVENTION

The present invention eliminates or provides automatic recovery from the afore-described race conditions and collisions in a NAT implementing a heuristic methodology, such as VPN Masquerade, for routing incoming packets from a common server to a plurality of clients that are communicating with the server and sharing a common access link.

In accordance with the present invention, when using a security protocol, such as IPSec, with a NAT implementing a heuristic methodology such as VPN Masquerade, transmission of actual data packets between a client and a server is delayed until an item is established by the NAT for that transmission between that client and server. This is achieved by imposing at the client a requirement to wait to switch to a new epoch or start a first epoch until negotiations have been completed between the client and the server for the SPIs and keys to be used in that new or first epoch and an item is established. In order to establish an item before a new or first epoch begins, the client sends a control packet to the server (i.e., "pings" the server) after negotiations have been completed using the new epoch's SPIs and keys, and waits to switch to the new epoch until a responsive control packet to that "ping" is received from the server. If a response to the "ping" is not received within a predetermined time, which may be indicative of the misdirection of the responsive signal to another client as a result of a collision or race condition, then the client "pings" the server again with another control packet. If, after a predetermined number of "pings", a response is not received, then the client automatically rekeys the tunnel, renegotiating new keys and SPIs, and recovers from the collision or race condition that likely caused the failure to receive a response to the "ping" from the server. Thus, if two clients randomly select the same incoming SPI, at least one of the clients will not receive a response to its "ping" and that client rekeys the tunnel, thereby choosing a different incoming SPI. This thus solves the problem that caused a collision. Further, by rekeying the tunnel, recovery is automatically attempted from a problem caused by a race condition.

If, in addition to delaying the client from switching to a new epoch until an item is established, the server with which it is communicating is also inhibited from switching to a new epoch (i.e., sending data packets) until it receives a "ping" from the client, then neither the first or second afore-noted race conditions can possibly occur. By refraining from sending data packets from the server to the client over the new epoch until a "ping" is received from the client on the new epoch, the item is likely to be established, thus preventing the these race conditions from happening.

Rather than imposing the above additional restriction on the server, which requires a modification to the software running on the server, an almost equal level of protection against the first and second race conditions can be achieved by configuring the client to ignore any attempt by a server to start a negotiation for rekeying the tunnel. With this additional restriction on the client rather than the server, the time interval during which the server could possibly send a packet to the client before it receives a "ping" from the client is very small as compared to the time interval that would otherwise exist if the server in fact could initiate a negotiation and switch to the new epoch before receiving a "ping" from the client.

The fourth race condition is also eliminated by requiring the client to "ping" and re-"ping" the server when it receives no response to the "ping" or when no packet is received on a tunnel for a predetermined period of time.

In accordance with the present invention, automatic recovery is provided in case of a collision and in case of the first through third race conditions described above. Further, by imposing the described restriction at the server, the possibility that either the first or second race conditions will occur is eliminated. Without imposing this functional restriction at the server, however, the possibility that either the first or second race conditions will occur can be made small by requiring that the client always initiate rekeying.

Whereas the possibility of a collision and the third race condition cannot be eliminated, the present invention provides automatic recovery if either such event does occur.

In further accord with the present invention, automatic recovery from a crash of the NAT is also provided. If attempts to rekey a tunnel are not successful, indicating that the NAT running VPN Masquerade has likely crashed, then a new IKE session is automatically started, providing failover recovery from that crash to another instance of VPN Masquerade on a different NAT.

BRIEF DESCRIPTION OF THE DRAWING

FIG. 4 shows the fields in an entry for IKE in a translation table in a NAT;

FIG. 5 shows the fields in an entry for ESP tunnel mode in a translation table in a NAT;

DETAILED DESCRIPTION

Figure 1:
FIG. 1 shows, as described above, how a first race condition can occur.
Figure 2:
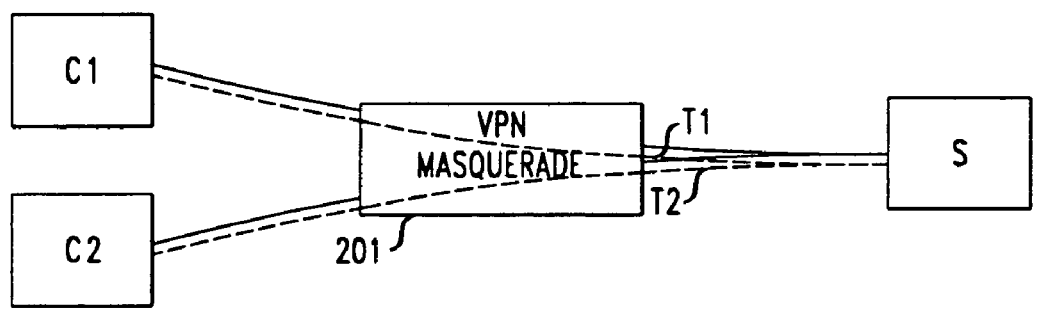
FIG. 2 shows, as described above, how the second, third and fourth race conditions can occur.
Figure 3:
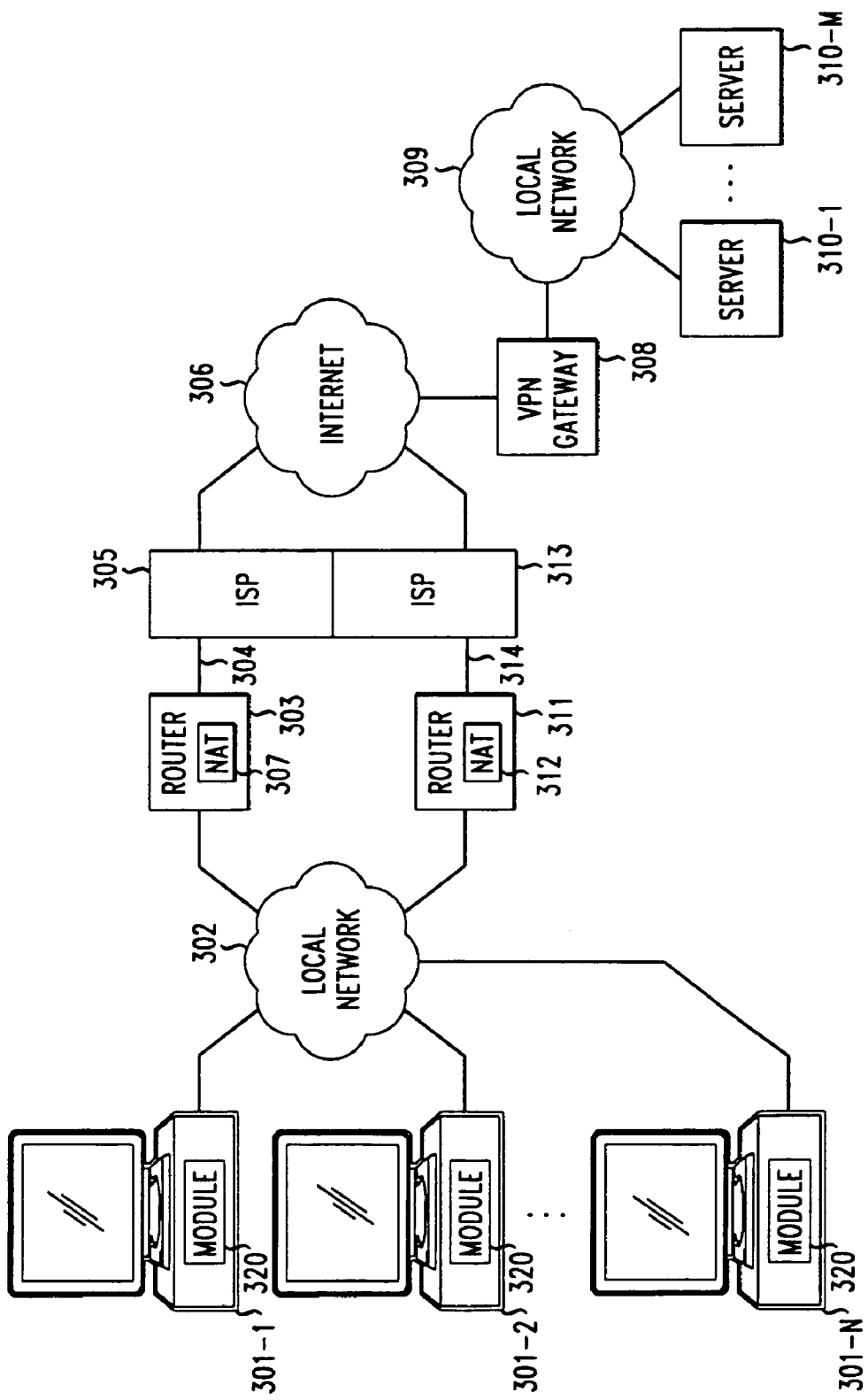
FIG. 3 is a block diagram of a network incorporating the present invention.

With reference to FIG. 3, a plurality of clients 301-1–301-N is connected on a local network 302. The local network 302 can be an Ethernet, a WaveLAN, or any other private network to which a plurality of operative clients can be simultaneously connected. The local network 302 is connected to a local router 303, which in turn is connected over a shared and typically high-bandwidth link 304 to an ISP 305, which provides access to the Internet 306. Link 304 can be, for example, a cable, a DSL, or a T1 line. Hotels, an airport lounge, a conference center, are examples of facilities at which a shared link could provide Internet connectivity to a plurality of users for connection of their portable PCs. In order to enable the plural clients 301-1–301-N to share the link 304, each client is assigned a private IP address by the local router 303. The non-permanent IP addresses assigned to these clients are from the set of non-routable IP addresses allocated by IANA for private network use. Router 303 is assigned one or more routable IP addresses by ISP 305. In order for the plural clients 301-1–301-N to share link 304, router 303 incorporates NAT software module 307 running VPN Masquerade. Router 303 is connected to ISP 305, which in turn is connected to the Internet 306. The Virtual Private Network Gateway (VPN Gateway) 308, running IPSec, interconnects the Internet 306 with another local network 309 associated with, for example, a corporation's local network. A plurality of servers 310-1–310-M may be connected to that local network 309. In order to provide fail-over protection in the event of the failure of router 303 or ISP 305, another router 311 incorporating a NAT software module 312 running VPN Masquerade may interconnect the local network 302 and another ISP 313 over link 314 for use when such failure occurs.

As previously described, a NAT software module 303 running VPN Masquerade translates the source or destination IP addresses of IKE packets and ESP tunnel mode encapsulating packets. Thus, when a client 301, running a virtual private network software module 320 that implements the IPSec security protocol, sends IKE or ESP tunnel mode packets to VPN Gateway server 308, NAT translates the source IP address in each such packet to the global IP address associated with router 303. Similarly, the destination address in each reply IKE or ESP tunnel mode packet received by NAT 307 from VPN Gateway server 308 is translated back to the destination IP address of the client on the local network. Because each of the clients 301-1–301-N share a single global IP address, VPN Masquerade allows, if heuristics are not employed, only one IKE and one ESP session between one of these clients and a given server such as VPN Gateway server 308. Specifically, without using heuristics, if NAT 307 receives a reply packet from the VPN Gateway server 308, then VPN Masquerade uses that server's IP address to identify which client to route the packet to. If more than one of the clients 301 sends packets to that same VPN Gateway server 308 while another of the clients 301 already has an ongoing session, then NAT 307 is unable to properly route all the packets received from server 308 to their intended clients.

In order to avoid a one-client/one-server limitation, which would not be practical in a situation such as in a conference center, as previously noted, where multiple attendees may work for the same company and simultaneously be desirous of accessing the same VPN Gateway server into their company's local network, VPN Masquerade is configured to operate without such a limitation by using heuristics to route packets. Specifically, VPN Masquerade, running as part of NAT 307, identifies the particular client 301 to which a packet from VPN Gateway server 308 is to be routed by checking that server's IP address from which the packet originated and, for IKE, the initiator and responder cookies, or for ESP, the incoming SPI. Tables are maintained by the NAT 307 implementing VPN Masquerade, that associate in an entry the local source IP address of a particular client 301 that is active in a session with the destination IP address of VPN Gateway server 308, together with, for an IKE negotiation, initiator and responder cookies, as well as an expiration time of the entry. FIG. 4 is an entry for IKE in such a table, showing the client IP address field 401, the server IP address field 402, the initiator cookie field 403, the responder cookie field 404, and the expiration time field 405. As earlier described, an item is considered outstanding or established according to whether the responder cookie is null or not, respectively. When an item is established, a packet from the server 308 is routed to the appropriate client 301 according to the associated entry in the table maintained by NAT 307. With respect to the ESP tunnel mode, a table of items is maintained containing client and server IP addresses and outgoing and incoming SPIs. Each item corresponds to an ESP tunnel's epoch, between successive rekeyings. FIG. 5 is an entry for an ESP tunnel mode session in a table, showing the client IP address field 501, the server IP address field 502, the incoming SPI field 503, the outgoing SPI field 504, and the item expiration time field 505. For the ESP tunnel mode, an item is considered outstanding or established according to whether the incoming SPI is null or not, respectively. What occurs when a client 301 sends a packet to VPN Gateway server 308 such that no item in the table matches the client and server IP addresses and outgoing SPI, or when the server sends a packet to the global IP address of router 303 running NAT 307 such that no established item matches the server IP address and incoming SPI is described hereinabove. As with IKE, once an item is established, an incoming ESP tunnel mode packet addressed to the global IP address of router 303 from VPN Gateway server 308 is routed to the client whose source IP address on network 302 in a table entry matches the server 308 IP address and the incoming SPI.

The various situations that, absent the present invention, can cause VPN Masquerade to fail have been described in detail hereinabove. As discussed, these situations include collisions and race conditions for the ESP tunnel mode. In addition, absent the present invention, there may not be support for fail-over recovery. With respect to the latter, local network 302 may be multi-homed as shown, connected to Internet 306 via router 303 and ISP 305, as well as through another router 311 running NAT 312 that implements VPN Masquerade. A client 301 may establish an ESP tunnel to the VPN Gateway server 308 via router 303 running NAT 307. If router 303 crashes, then the client's ESP packets may be rerouted to router 311 running NAT 312 and reach VPN Gateway server 308. The responsive packets sent by VPN Gateway server 308 may continue, however, to be sent to NAT 307 and therefore not reach client 301.

In accordance with the present invention, the client software 320 running on each client 301 that implements, in this embodiment, the IPSec protocol, prevents at least some of these race conditions and/or recovers from crashes or collisions.

In Linux's IPSec implementation of VPN Masquerade, an ESP tunnel's lifetime is characterized by three parameters: keylife (having a default of 8 hours), rekeymargin (default of 9 minutes), and rekeyfuzz (default of 100%). If IKE creates or rekeys an ESP tunnel, i.e., generates two new SAs, one in each direction, at time $t_0$, both peers, the client and server, use these SAs to send packets since $t_0$ until some time $t_1$, when the tunnel is rekeyed, and accept received packets that use these SAs since time $t_0$ until ($t_0$+keylife). At a random time between [$t_0$+keylife−(1+rekeyfuzz)*rekeymargin] and ($t_0$+keylife−rekeymargin), an IKE negotiation is initiated to rekey the tunnel, if none has already started. This negotiation is expected to complete successfully at some time t1, t1<= ($t_0$+keylife).

The embodiment of the present invention introduces parameters maxidle, pingtime, and pingtries for clients. In accordance with the present invention, in order to establish an item before a data packet may be transmitted by the server prior to the client sending a data packet, the client, immediately after a tunnel is created or keyed, sends a control packet, for example a "ping" (i.e., an ICMP echo request packet) to the server using the new epoch's outgoing SA. Additionally, if a client has not received any packets through an incoming SA for a period greater than maxidle, the client sends a "ping" request through the corresponding outgoing SA. If, having sent the last ping request more than pingtime ago, the client has not received any packet through the corresponding incoming SA, the client resends the "ping" request, up to pingtries time. If, after pingtries attempts, the client has not received any packet through the incoming SA, the client starts a new IKE negotiation to rekey the tunnel.

Tunnel rekeying provides automatic recovery in cases of incoming SPI collision or the third race condition previously discussed. The parameter maxidle should preferably be set to a value less than that used to timeout established ESP items, $T_{ei}$. This prevents the fourth race condition previously discussed. Preferably, parameters pingtime and pingtries should obey:

$$\text{pingtime} >= T_{out}/N_{out},$$

so that a "ping" retry will not be dropped while the corresponding ESP item is outstanding, even if that item causes other tunnels' "pings" to the same server to be dropped, and:

$$\text{pingtime} * \text{pingtries}/T_{out} > N,$$

where N is a reasonably large number, so that a "ping" will be eventually forwarded even if the "ping" successively collides with N other tunnels' unanswered "pings" to the same server. The parameters $T_{ei}$, $T_{out}$, and $N_{out}$ were defined in the Background of the Invention above.

In further accord with the present invention, after a tunnel is rekeyed, each peer (client and server) continues to use the previous epoch's outgoing SA to send packets (except for "ping" requests, as described above), until the peer receives a packet through the new epoch's incoming SA, or until the previous epoch's time ($t_0$+keylife−rekeymargin), whichever occurs first. After that, the peer uses the new epoch's outgoing SA to send packets.

This change prevents the above-described first and second race conditions. Additionally, this change may prevent data packets from being dropped that are sent from the client to the server immediately after rekeying. Without this change, such packets would be dropped if the server has another client's ESP item outstanding. With the present invention, peers wait until the "ping" request and reply establish the ESP item of a new epoch before using that epoch's SAs to send data.

The dovetailing of successive tunnel epochs and avoidance of timeouts of established items may be disrupted if VPN Masquerade crashes. When VPN Masquerade restarts, it is susceptible to SPI collisions and all the afore-described race conditions. Regardless of the cause of the failure, however, the periodic "pings" will detect the lack of connectivity and promote automatic recovery by rekeying the involved tunnels.

Further improvements are achieved if, upon a client's repeated attempts to rekey a tunnel, no reply from the server is received, then the client drops the existing IKE session and starts a new IKE session. This provides end-to-end recovery in the case of multi-homing and fail-over to another VPN Masquerade instance running on the same or a different server. The new IKE session and any ESP tunnels created by it will be routed through the back-up VPN Masquerade instance, restoring connectivity.

As noted above, both the client and the server continue to use the previous epoch's outgoing SA to send packets until it receives a packet through the new epoch's incoming SA. After that, the new epoch's outgoing SA is used to send packets. This requires implementation of the present invention at both the client and the server. If a client that incorporates the present invention establishes an ESP tunnel with a server that does not incorporate the present invention, the use of client initiated "pings" and server replies provide the benefits of preventing the fourth race condition and automatic recovery from SPI collisions or other failures. Also, these automatic "pings" reduce the probability of the first and second race conditions. A server that does not incorporate the present invention may not wait for the reception of the "ping" (or other packet) on the new epoch's incoming SA before using the new epoch's outgoing SA. The interval between the beginning of the epoch and the server's reception of the first packet is typically very short. If the server does not incorporate the present invention, further protection is afforded by configuring the client to ignore any attempts by the server to initiate an IKE negotiation.

Figure 6A:
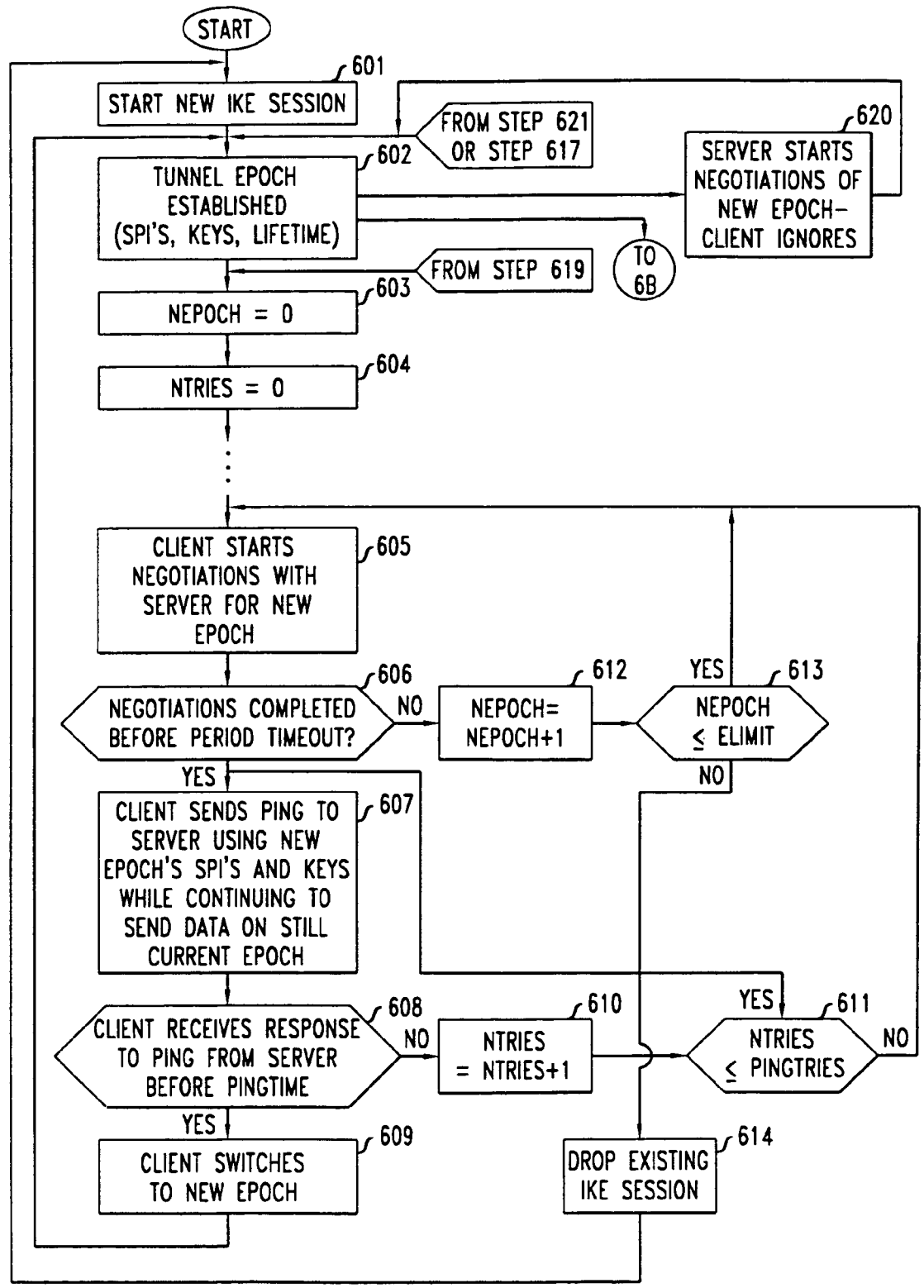
FIGS. 6A and 6B together are a flowchart showing the steps at a client in accordance with the present invention.
Figure 6B:
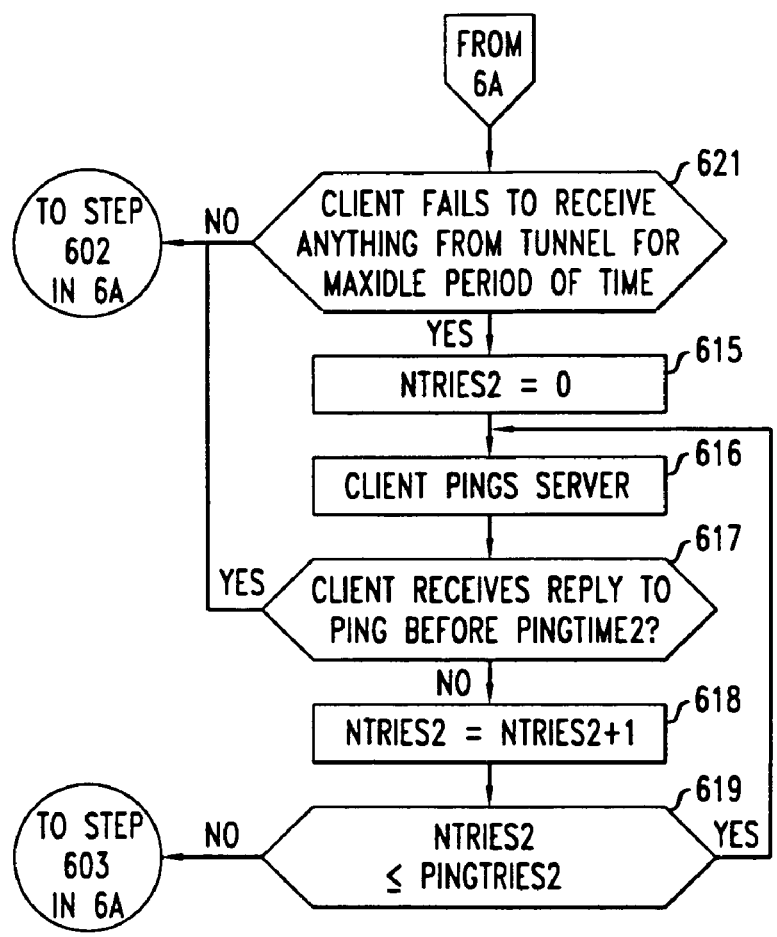

With reference to the flowchart in FIGS. 6A and 6B, which together summarize the functionalities at the client of the present invention, at step 601, a new IKE session is started between a client (e.g., one of the clients 301) and a server (e.g., VPN Gateway server 308). At step 602, a tunnel epoch is established within the new IKE session, its SPIs, keys and lifetime being determined. Once the epoch is established, ESP tunnel mode packets can be transferred between the client and the server. Following the establishment of the epoch, at step 603, the counter NEPOCH is set at zero, and at step 604, the counter NTRIES is set at zero. At a sufficient time before the end of the epoch's lifetime, at step 605, the client starts negotiations with the server for new keys, SPIs, etc. If, at step 606, the negotiations for the new epoch are completed before a predetermined timeout period, TIMEOUT, then the client, at step 607, sends a "ping" (the ICMP echo request packet) to the server using the new epoch's SPIs and keys, while continuing to send and receive data packets using the still current epoch's SPIs and keys.

If, at step 608, the client receives a response to its "ping" (i.e., an ICMP echo reply packet) from the server before a predetermined timeout period, PINGTIME, then it switches, at step 609, to the new epoch (i.e., starts sending and receiving data using the new epoch's keys and SPIs) and returns to step 602, since the new tunnel epoch is now established. If there is a packet loss (e.g., due to a transmission error or congestion on the network), collision or race condition, then, at step 608, the client will not receive a response to its "ping" from the server before the timeout period, PINGTIME, but will again "ping" the server in an attempt to get a response. Before "repinging" the server, however, the number of attempts that have been made to "ping" the server is compared with a limit. Thus, at step 610, the number of "ping" tries, NTRIES, is incremented by one, and at step 611, NTRIES is compared with a predetermined limit, PINGTRIES. If NTRIES is less than or equal to PINGTRIES, then the flow returns to step 607, where the client again "pings" the server. If, however, NTRIES is greater than PINGTRIES, then the flow returns to step 605, where the client starts negotiations for a new epoch. Thus, when the client fails to receive a response to its "ping" on any of its up to PINGTRIES attempts, which may be indicative of a collision or race condition, the automatic renegotiation of a new epoch with new keys and SPIs will likely enable VPN Masquerade running the NAT to automatically recover.

At step 606, the negotiation of a new epoch may not be completed before the predetermined timeout period, TIMEOUT, if, for example, there are packet losses due to transmission errors or congestion, or there is a failure of the NAT 307 running on the router 303, access link 304, or ISP 305. Thus, if negotiations for the new epoch are not completed, then, at step 612, the number of attempts to negotiate a new epoch represented by the NEPOCH counter is incremented by one and, at step 613, NEPOCH is compared with a predetermined limit, ELIMIT. If NEPOCH is less than or equal to ELIMIT, the client again starts a negotiation of a new epoch at step 605. If, however, NEPOCH is greater than ELIMIT, then there is probably a failure in NAT 307, access link 304, or ISP 305. Therefore, at stop 614, the existing IKE session is dropped. A new IKE session is started at step 601. The new IKE session will be routed over the then operational network elements (e.g., NAT 312 running on router 311, access link 314, and ISP 313), thereby automatically effecting recovery.

After a tunnel epoch is established, at step 602, if, at step 621, the client fails to receive anything from the tunnel for a predetermined period of time, MAXIDLE, then it will attempt to keep the item established in the NAT by "pinging" the server. At step 615, a counter, NTRIES2, is set at zero. At step 616, the client "pings" the server. If, at step 617, the client receives a reply to its "ping" from the server before predetermined timeout period, PINGTIME2, which may be the same as the timeout period PINGTIME noted above, then the epoch remains active and the flow returns to step 602. If, however, the client does not receive a reply from the server to this "ping", then, at step 618, NTRIES2 is incremented by one and, at step 619, NTRIES2 is compared with PINGTRIES2, which may be the same value as PINGTRIES noted above. If NTRIES2 is less than or equal to PINGTRIES2, then the client sends another "ping" to the server, at step 616. If NTRIES2 is greater than PINGTRIES2, then the flow returns to step 603, where NEPOCH is reset to zero, and where thereafter, the client starts a negotiation for a new epoch. If the time limit MAXIDLE is set sufficiently low, then by successfully "pinging" the server, the item remains active and starting a new epoch due to tunnel inactivity is not likely to occur.

As previously noted, if the server is not modified to preclude it from switching to a new epoch until it receives a "ping" from the client, then the time interval of vulnerability during which the server could send a packet to the client before receiving a "ping" from the client can be limited by configuring the client to ignore all server-initiated negotiations of new epochs. Thus, in FIG. 6A, after a tunnel epoch is established at step 602, at step 620, any subsequent attempt by the server to start the negotiation of a new epoch is ignored by the client.

Figure 7:
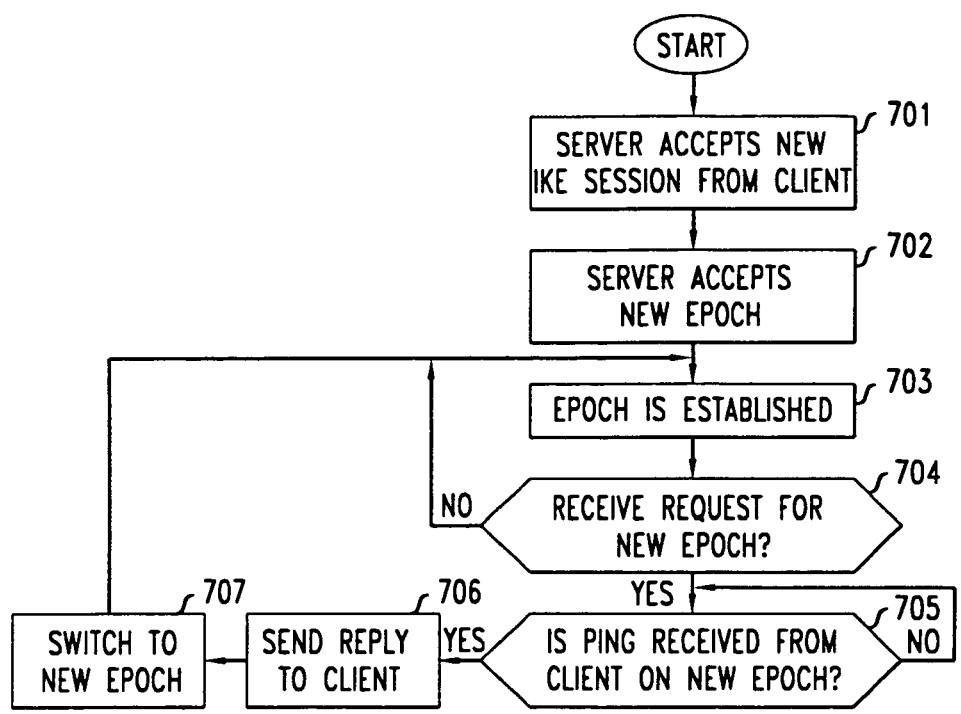
FIG. 7 is a flowchart showing the steps at a server that is modified in accordance with the present invention.
Figure 8:
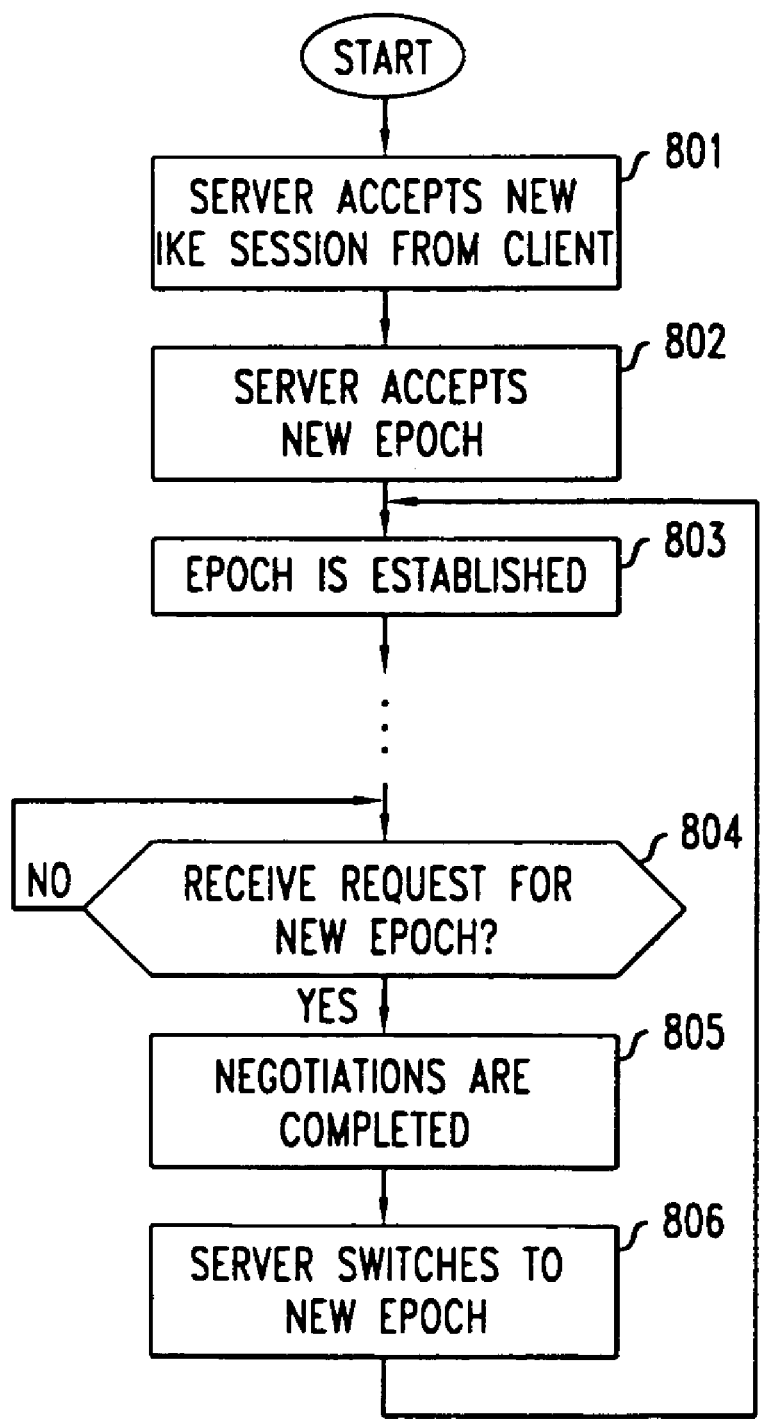
FIG. 8 is a flowchart showing the steps at a server that is not modified as it interacts with a client that is functioning in accordance with the present invention.

The server-oriented functionalities associated with the present invention are illustrated in FIGS. 7 and 8. FIG. 7 is a flowchart that illustrates the steps at a server that is modified to preclude it from switching to a new epoch until it receives a "ping" from the client. As previously noted, by modifying the server, the first and second race conditions cannot occur. At step 701, the server accepts a new IKE session from the client. At step 702, the server accepts a new epoch and, at step 703, the epoch is established. At step 704, the server waits to receive a request for a new epoch. The flow returns to step 703 until such time that a request for a new epoch is received. When it receives a request for a new epoch, a determination is made, at step 705, whether a "ping" is received from the client using the new epoch's SPI. If it does not receive that "ping," then the server remains in the present epoch. If it does receive that "ping," then, at step 706, it sends a reply "ping" to the client and, at step 707, switches to the new epoch. The flow then returns to step 703 where the new epoch is established.

If the server is not modified, then it functions in a conventional VPN Masquerade manner, as show in FIG. 8. At step 801, the server accepts a new IKE session from the client. At step 802, the server accepts a new epoch and, at step 803, the epoch is established. At step 804, the server waits to receive a request for a new epoch. The flow remains at step 804 until such time that a request for a new epoch is received. After the request for a new epoch is received, at step 805, negotiations are completed. At step 806, the server then switches to the new epoch, regardless of whether a "ping" is received from the client or not, and the flow returns to step 803. The server may also attempt to initiate a negotiation. As noted in the discussion of FIGS. 6A and 6B above, however, any attempt by the server to start the negotiation of a new epoch is ignored by the client.

The present invention is operative in the background of IPSec IKE and ESP tunnel mode communication between clients and servers through a NAT running VPN Masquerade. A user at a client is afforded automatic recoverability due to a collision, race conditions, or improper fail-over without having to affirmatively take any action. Thus, if the user is using his mail program and requests the contents of a message, and it fails to be automatically retrieved due to one of these deleterious conditions, the present invention effects an automatic recovery, which is essentially transparent to the user. Absent the present invention, if a race condition or collision occurs, the user of a client would need to reboot his computer in order to recover from such a problem that interrupted delivery to the client of the packets directed to it.

In the described embodiment, the clients on the private network share a common link to the routable packet-based network. The use of NAT enables incoming packets to be directed to the client to which they are destined. The use of certain security protocols that encrypt parts of the packet prevent the NAT from being able to unambiguously route packets to their proper destination. Rather, heuristics are employed at the NAT to determine routing of packets from a server to a client on the local network. The present invention has been described in conjunction with the IPSec IKE and ESP tunnel modes. It should be understood, however, that the present invention is not limited to the IPSec protocol and can be used by clients on a local network running any protocol in which the NAT cannot unambiguously route packets and must instead apply heuristics to determine which client should be sent which packet. As described, the use of heuristics to determine packet routing can cause decisions to be made, which are based on suppositions that at a given time may not be correct. As a result, collisions and race conditions can occur, which lead to improper delivery of packets and/or crashes.

The foregoing merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be appreciated that the flow charts represent various processes, which may be substantially represented in computer readable medium and so executed by a computer or processor, whether or not such computer or processor is explicitly shown.

The invention claimed is:

1. A method comprising:
after a secure tunnel has been created between a first endpoint and a second endpoint on a packet network which tunnel traverses at least one network address translator (NAT) that is functioning independently of the first and second endpoints and that implements VPN Masquerade and that, in outgoing packets, sent from the first endpoint to the second endpoint, notes but does not change a packet's security association identifier located within the packet and translates a private address of the first endpoint to a shared global address that is not uniquely associated with the first endpoint and, in incoming packets, sent from the second endpoint to the shared global address, notes but does not change a packet's security association identifier and translates the global address to which the packet is addressed to a private address, which address is determined by heuristically matching the second endpoint's address and incoming security association identifier with the first endpoint's private address and outgoing security association identifier, where mismatches may occur due to collisions and/or race conditions in the use of security association identifiers, and which tunnel is operating under a secure protocol that is independent of whatever applications are running on the first and second endpoints, and before one or more packets containing application data are sent between the first and second endpoints, sending a control packet from the first endpoint of the tunnel through the tunnel to the second endpoint of the tunnel; and waiting at the first endpoint for a responsive control packet through the tunnel from the second endpoint before sending packets containing application data through the tunnel wherein race conditions and collisions in the use of the security association identifiers in forwarding packets sent by the second endpoint to the first endpoint are eliminated or automatic recovery from them is provided.

2. The method of claim 1 wherein the tunnel uses the IPSec security protocol suite.

3. The method of claim 2 wherein the tunnel uses ESP in tunnel mode.

4. The method of claim 1 wherein the first endpoint is a client and the second endpoint is a server.

5. The method of claim 1 wherein the control packet is an ICMP echo request packet and the responsive control packet is an ICMP echo reply packet.

6. The method of claim 2 wherein the tunnel is defined by an epoch, the epoch comprising one security association (SA) in each direction, each SA having a negotiated limited lifetime and defining the use of the ESP protocol in tunnel mode with negotiated authentication and/or encryption keys and with a security parameters index (SPI) chosen by the SA's destination.

7. The method of claim 6 wherein before the end of tunnel's lifetime the endpoints establish a new tunnel between them.

8. The method of claim 7 wherein a designated one of the endpoints has responsibility for establishing the new tunnel and ignores requests initiated by the other endpoint to establish a new tunnel.

9. The method of claim 1 wherein the second endpoint waits for a packet from the first endpoint through the tunnel before using the tunnel to send any packets.

10. The method of claim 1 wherein if the first endpoint does not receive any packets through the tunnel for a predetermined time interval then the first endpoint sends another control packet through the tunnel to the second endpoint.

11. The method of claim 10 wherein if the first endpoint sends through the tunnel to the second endpoint a predetermined maximum number of control packets without receiving any packets through the tunnel then the first endpoint establishes a new tunnel to the second endpoint.

12. The method of claim 7 wherein if one of the endpoints is unable to complete the establishment of a new tunnel to the other endpoint before a predetermined time limit then that one endpoint abandons establishment of that tunnel and starts establishing a new tunnel to the other endpoint.

13. The method of claim 12 wherein if the one of the endpoints successively fails to establish a new tunnel for more than a predetermined maximum number of times to the other endpoint then that one endpoint closes the connection currently being used to establish tunnels with the other endpoint and opens another such connection.

14. The method of claim 13 wherein the connection used to establish tunnels between the endpoints is an IKE session.

15. A computer readable media tangibly embodying a program of instructions executable by a computer to perform a method, the method comprising:

after a secure tunnel has been created between a first endpoint and a second endpoint on a packet network which tunnel traverses at least one network address translator (NAT) that is functioning independently of the first and second endpoints and that implements VPN Masquerade and that, in outgoing packets, sent from the first endpoint to the second endpoint, notes but does not change a packet's security association identifier located within the packet and translates a private address of the first endpoint to a shared global address that is not uniquely associated with the first endpoint and, in incoming packets, sent from the second endpoint to the shared global address, notes but does not chance a packet's security association identifier and translates the global address to which the packet is addressed to a private address, which address is determined by heuristically matching the second endpoint's address and incoming security association identifier with the first endpoint's private address and outgoing security association identifier, where mismatches may occur due to collisions and/or race conditions in the use of security association identifiers, and which tunnel is operating under a secure protocol that is independent of whatever applications are running on the first and second endpoints, and before one or more packets containing application data are sent between the first and second endpoints, sending a control packet from the first endpoint of the tunnel through the tunnel to the second endpoint of the tunnel; and waiting at the first endpoint for a responsive control packet through the tunnel from the second endpoint before sending packets containing application data through the tunnel wherein race conditions and collisions in the use of the security association identifiers in forwarding packets sent by the second endpoint to the first endpoint are eliminated or automatic recovery from them is provided.

16. The computer readable media of claim 15 where in the method the tunnel uses the IPSec security protocol suite.

17. The computer readable media of claim 16 where in the method the tunnel uses ESP in tunnel mode.

18. The computer readable media of claim 15 where in the method the first endpoint is a client and the second endpoint is a server.

19. The computer readable media of claim 15 where in the method the control packet is an ICMP echo request packet and the responsive control packet is an ICMP echo reply packet.

20. The computer readable media of claim 16 where in the method the tunnel is defined by an epoch, the epoch comprising one security association (SA) in each direction, each SA having a negotiated limited lifetime and defining the use of the ESP protocol in tunnel mode with negotiated authentication and/or encryption keys and with a security parameters index (SPI) chosen by the SA's destination.

21. The computer readable media of claim 20 where in the method before the end of tunnel's lifetime the endpoints establish a new tunnel between them.

22. The computer readable media of claim 21 where in the method a designated one of the endpoints has responsibility for establishing the new tunnel and ignores requests initiated by the other endpoint to establish a new tunnel.

23. The computer readable media of claim 15 where in the method the second endpoint waits for a packet from the first endpoint through the tunnel before using the tunnel to send any packets.

24. The computer readable media of claim 15 where in the method if the first endpoint does not receive any packets through the tunnel for a predetermined time interval then the first endpoint sends another control packet through the tunnel to the second endpoint.

25. The computer readable media of claim 24 where in the method if the first endpoint sends through the tunnel to the second endpoint a predetermined maximum number of control packets without receiving any packets through the tunnel then the first endpoint establishes a new tunnel to the second endpoint.

26. The computer readable media of claim 21 where in the method if one of the endpoints is unable to complete the establishment of a new tunnel to the other endpoint before a predetermined time limit then that one endpoint abandons establishment of that tunnel and starts establishing a new tunnel to the other endpoint.

27. The computer readable media of claim 26 where in the method if the one of the endpoints successively fails to establish a new tunnel for more than a predetermined maximum number of times to the other endpoint then that one endpoint closes the connection currently being used to establish tunnels with the other endpoint and opens another such connection.

28. The computer readable media of claim 27 where in the method the connection used to establish tunnels between the endpoints is an IKE session.

* * * * *